Oct. 1, 1968  B. A. BEDFORD  3,403,421
ANIMAL SKINNER

Filed April 13, 1966  2 Sheets-Sheet 1

Beryl A. Bedford
INVENTOR.

Oct. 1, 1968  B. A. BEDFORD  3,403,421
ANIMAL SKINNER
Filed April 13, 1966  2 Sheets-Sheet 2
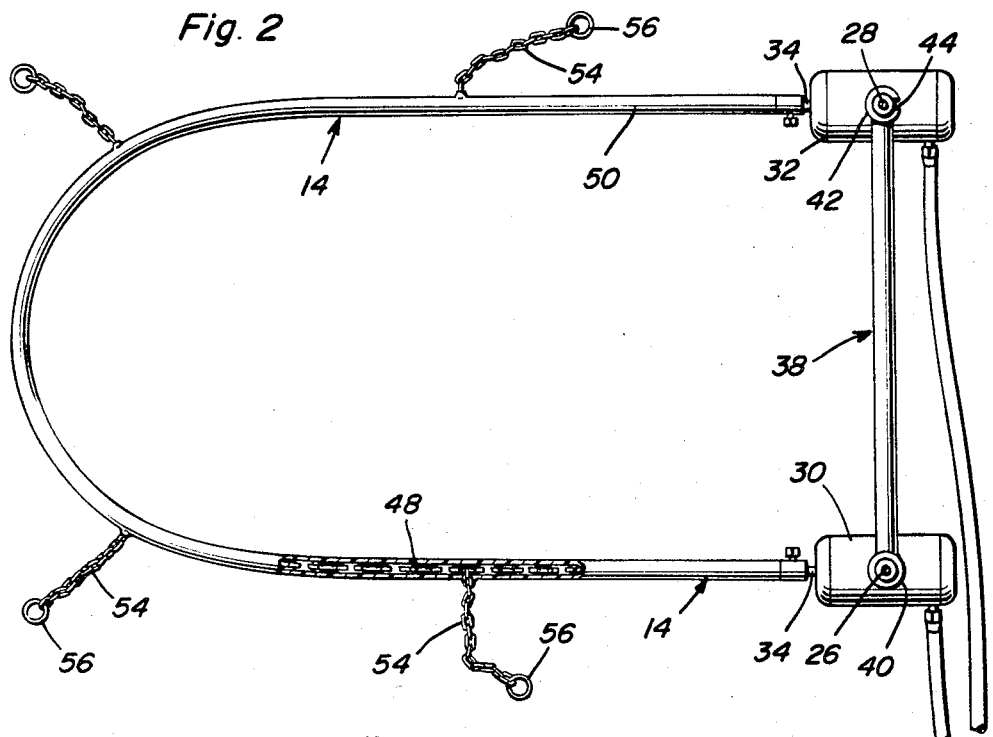
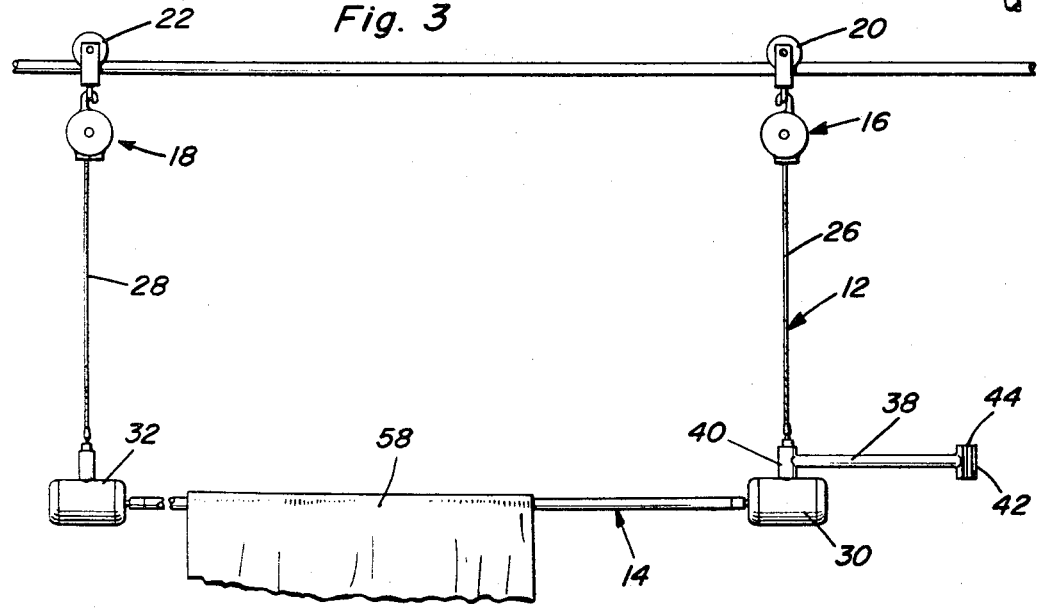
Beryl A. Bedford
INVENTOR.

United States Patent Office 3,403,421
Patented Oct. 1, 1968

3,403,421
ANIMAL SKINNER
Beryl A. Bedford, 701 Hurlingame Ave.,
Redwood City, Calif. 94063
Filed Apr. 13, 1966, Ser. No. 542,321
11 Claims. (Cl. 17—21)

ABSTRACT OF THE DISCLOSURE

An elongated flexible member positioned to form a generally horizontally disposed loop adapted to extend about and embrace an upstanding torso and supported solely from its opposite ends by means operative to rotate the flexible member about its longitudinal axis. The flexible member includes means spaced longitudinally therealong for attachment to selected portions of the skin of an animal torso embraced by the flexible member.

---

This invention relates to a novel and useful animal skinner and more specifically to an apparatus designed to assist in stripping the skin from an animal carcass.

The animal skinner of the instant invention is designed primarily for use in the meat industry and to provide a means whereby the skinning of cattle, sheep and other animals may be more readily performed. Although the skinner of the instant invention is specifically illustrated and described hereinafter as being used in conjunction with cattle carcasses, it is to be understood that the skinner may also be utilized to assist in skinning game animals such as deer, buffalo and moose, etc.

The animal skinner of the instant invention is slightly similar to the hide-stripping device disclosed in U.S. Patent No. 2,770,006, dated Nov. 13, 1956, in that it also includes an elongated carcass-embracing and flexible chain, whose opposite ends are rotatably supported and have drive means operatively associated therewith for causing the chain to rotate about its longitudinal axis. However, the aforementioned hide-stripping device includes a pair of such flexible chains disposed in side-by-side relation and including resilient and generally cylindrical covered portions for adjacent links of each of the chains and with corresponding covered portions of the chains disposed in tight rolling frictional engagement with each other. With these two chains disposed in a position embracing the carcass which is to be stripped, the initial portions of the hide to be stripped from the carcass are inserted between corresponding cylindrical covered portions of the patented device whereby continued inverse rotation of the cylindrical covered portions of the chains will cause the hide to be pulled from the associated carcass.

In the instant invention, only one elongated flexible chain is utilized and the latter is provided with anchor members spaced longitudinally therealong each adapted for securement to a corresponding portion of the hide which is to be stripped from an animal carcass. In this manner, as the chain is rotated about its longitudinal axis the hide which is to be stripped is rolled onto the chain.

Inasmuch as the single chain of the instant invention does not have to have longitudinally spaced portions thereof maintained in tight frictional rolling engagement with corresponding portions of a companion flexible chain, longitudinally spaced portions of the chain of the instant invention may shift slightly above or below the horizontal plane in which the chain is generally disposed so as to compensate for hide or skin portions of different thicknesses being wound thereon.

The main object of this invention is to provide an animal skinner which will be capable of greatly facilitating the task of skinning the hide from an animal carcass.

Another object of this invention, in accordance with the immediately preceding object, is to provide an animal skinner that will in addition to greatly reducing the time required to skin animals substantially reduce the amount of hand skinning that is usually associated with and required when utilizing a mechanical skinner.

A final object of this invention to be specifically enumerated herein is to provide an animal skinner in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged plan view of the animal skinner shown with the flexible chain thereof disposed in an open loop for embracing an animal carcass which is to be skinned as opposed to a closed loop such as that illustrated in FIGURE 1;

FIGURE 3 is an elevational view of the animal skinner shown in its operative position after just completing stripping the skin or hide from an animal carcass and in position preparatory to having the hide removed or unrolled from the flexible chain portion of the skinner;

FIGURE 4 is an enlarged perspective view of a portion of the flexible chain of the skinner showing the manner in which a corresponding anchor member supported by the chain may be suitably anchored to a portion of the hide which is to be stripped from an animal;

Figure 1:
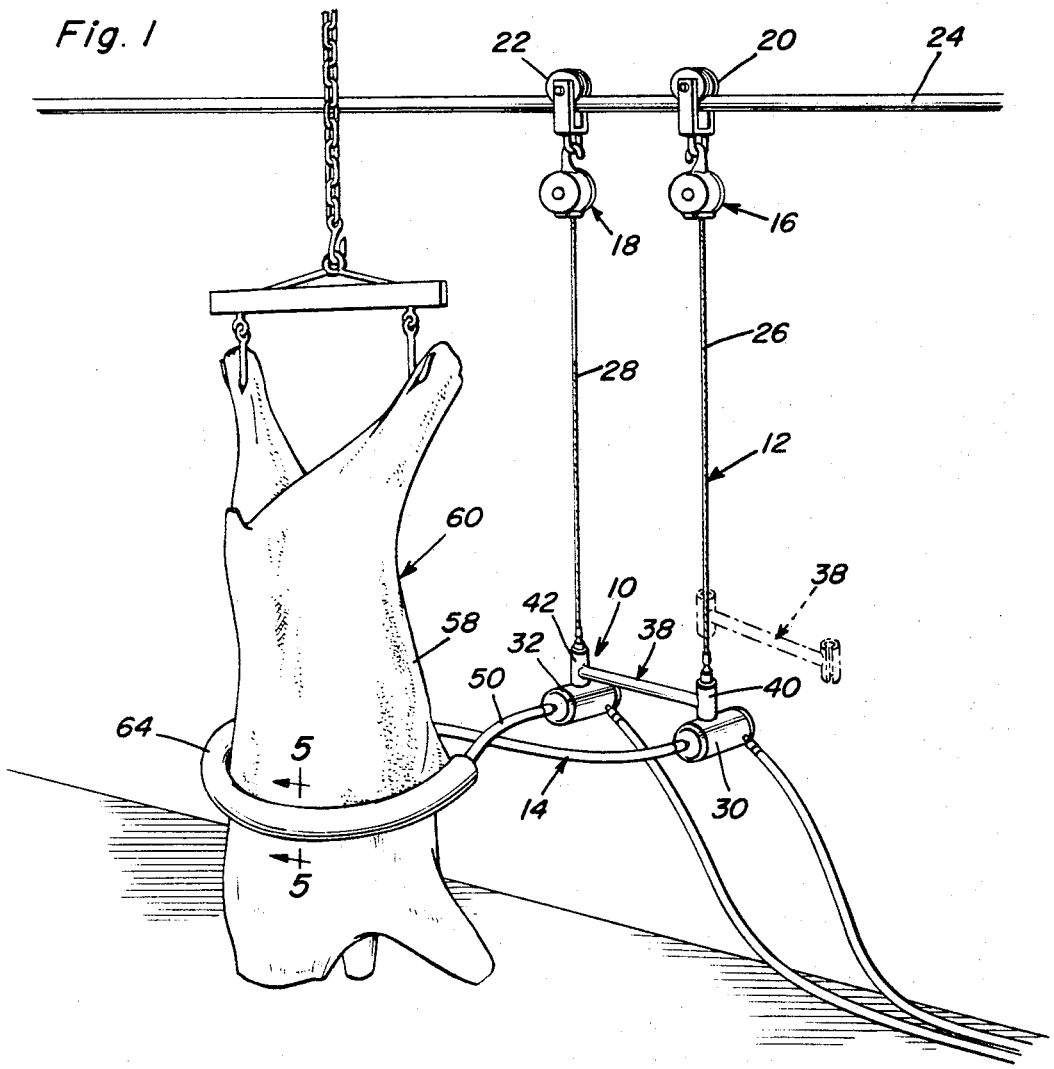
FIGURE 1 is a perspective view of the animal skinner shown in use skinning the hide from an animal carcass.

Referring now more specifically to the drawings, the numeral 10 generally designates the animal skinner of the instant invention. The animal skinner 10 includes support means generally designated by the reference numeral 12 and an elongated flexible chain assembly generally referred to by the reference numeral 14 journalled and driven at its opposite ends from the support means 12.

The support means 12 includes a pair of spring-return reel assemblies generally referred to by the reference numerals 16 and 18 removably supported from trolley members 20 and 22, respectively, rollingly engaged with a horizontally disposed support 24. The reel assemblies 16 and 18 include elongated tension members 26 and 28, respectively, which are supported from the reel assemblies 16 and 18 for extension and retraction of the free end portions thereof and which are spring-urged toward retracted positions.

The lower ends of the tension members are secured to electric motors 30 and 32, respectively, each including a rotatable output shaft 34. Each of the motors 30 and 32 includes an upstanding rod-like arm 36 and a brace member generally referred to by the reference numeral 38 and including upstanding tubular members 40 and 42 on its opposite end portions interconnects the arms or arm members 36 by telescopic engagement of the tubular members 40 and 42 down over the upper ends of the arms 36 with the lower ends of the tubular members resting upon the adjacent portions of the motors 30 and 32. The arm members 36 are greater in diameter than the adjacent portions of the tension members 26 and 28 and the tubular sleeve or sleeve member 42 is longitudinally slotted as at 44. In this manner, when the sleeves 40 and 42 are raised above the arms 36, the sleeve 42 may be disengaged from the tension member 28 by rotating the brace 38 about the arm 36 carried by the motor 30 in order to pass the tension member 28 through the slot 44.

The endless flexible member or chain 14 comprises a plurality of longitudinally spaced and pivotally interconnected chain link assemblies 48 and the chain defined by the pivotally interconnected link assemblies 48 is provided with a resilient covering 50 throughout a major portion of its length. The opposite ends of the chain 14 are secured to the output shafts 34 of the motors 30 and 32 for rotation therewith and it may be seen from FIGURES 2 and 4 of the drawings that the chain 14 includes a plurality of longitudinally spaced anchor members 54 comprising short lengths of flexible chains secured at one end to a corresponding chain link assembly 48 and provided with a large diameter slip ring 56 at each of their free ends. The shorter chains 54 of course extend through the flexible and resilient covering 50 as shown in FIGURES 2 and 4 of the drawings and it may be seen from FIGURE 4 that the short chains 54 may be readily secured to adjacent portions of the hide or skin 58 of an animal carcass generally referred to by the reference numeral 60 supported in a vertically elongated position adjacent the animal skinner 10.

Figure 5:
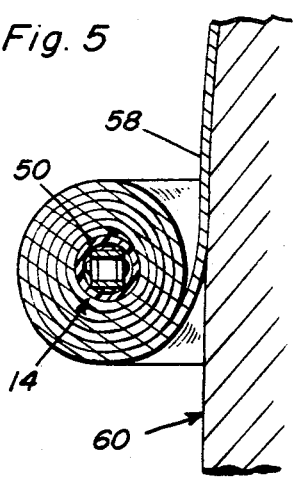
FIGURE 5 is an enlarged fragmentary vertical sectional view taken substantially upon the plane indicated by the section line 5—5 of FIGURE 1.
Figure 6:
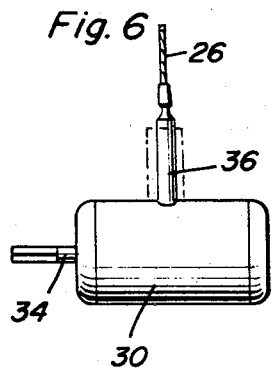
FIGURE 6 is a side elevational view of one of the motor means provided for rotatably supporting and rotatably driving the corresponding end of the flexible chain of the skinner.
Figure 7:
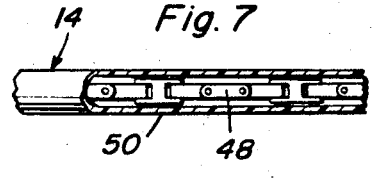
FIGURE 7 is an enlarged fragmentary elevational view of one portion of the flexible chain with portions of the resilient covering therefor broken away and shown in section.

It is to be understood that the electric motors 30 and 32, when simultaneously actuated, will cause rotation of the adjacent ends of the chain 14 at substantially the same speed and that the output shafts 34 represent output shafts of built-in gear reduction assemblies comprising portions of the electric motors 30 and 32. Still further, with the free ends of the chains 54 secured to selected portions of the hide 58 in the manner illustrated in FIGURE 4 of the drawings, rotation of the chain 14 will cause the hide 58 to be rolled about the chain 14 in the manner illustrated in FIGURE 5. Further, as the weight of the closed end of the loop formed by the chain 14 is transferred to the carcass 60, the spring reel assemblies 16 and 18 will be underbalanced thereby raising the motors 30 and 32 automatically as the roll 64 of the hide 58 moves upwardly along the unskinned portion of the carcass 60.

After the hide 58 has been completely rolled on the chain 14, the brace 38 may be disengaged from the arm 36 of the motor 32 by moving the brace 38 to the position illustrated in phantom lines in FIGURE 1 of the drawings. Then, the trolley member 22 may be rolled down the horizontal support member or track 24 to the position thereof illustrated in FIGURE 3 of the drawings straightening out the chain 14. At this point, the free end of the hide 58 may be grasped and pulled upon so as to be unrolled from the chain 14.

The foregoing is considered as illustrative only of the principles of the invention. Further, since numerous modifications and changes will readily occur to those skilled in the art, it is not desired to limit the invention to the exact construcion and operation shown and described, and accordingly all suitable modifications and equivalents may be resorted to, falling within the scope of the invention as claimed.

What is claimed as new is as follows:

1. An animal skinner comprising a pair of journalled drive shafts, an elongated flexible member supported solely from said shafts and disposed so as to follow a path defining an animal embracing curvature and including opposite end portions connected to said shafts for rotation therewith, means drivingly connected to said shafts for imparting rotation thereto and thereby operable to cause said flexible member to rotate about its longitudinal axis, said flexible member including means spaced longitudinally therealong adapted for attachment to selected portions of the skin of an animal carcass embraced by said flexible member, whereby said skin may be wound on said flexible member upon rotation of the latter.

2. The combination of claim 1 wherein said flexible member comprises a chain.

3. The combination of claim 2 including a covering of resilient material enclosing said chain throughout at least a major portion of its length.

4. An animal skinner comprising a pair of journalled drive shafts, an elongated flexible member disposed so as to follow a path defining an animal embracing curvature and including opposite end portions connected to said shafts for rotation therewith, said shafts including means adapted to impart rotation thereto in order to cause said flexible member to rotate about its longitudinal axis, said flexible member including means spaced longitudinally therealong adapted for attachment to selected portions of the skin of an animal carcass embraced by said flexible member, whereby said skin may be wound on said flexible member upon rotation of the latter, said flexible member comprising a chain, a covering of resilient material enclosing said chain throughout at least a major portion of its length, said means spaced longitudinally of said flexible member comprising a plurality of short elongated flexible anchor elements each secured at one end to said flexible member for rotation therewith and including means at the other end portion adapted for securement to said skin.

5. The combination of claim 1 wherein there is provided support means for journalling said drive shafts, means connected wtih said support means and adapted to suspend the latter for vertical movement, said suspension means including counterbalance means substantially balancing the weight of said support means, said shafts and said flexible member.

6. The combination of claim 5 wherein said counterbalance means include means individually balancing said shafts, the corresponding ends of said flexible member, and the corresponding portions of said support means.

7. The combination of claim 1 wherein there is provided support means for journalling said drive shafts, means connected with said support means and adapted to suspend the latter for vertical movement, said suspension means including counterbalance means substantially balancing the weight of said support means, said shafts and said flexible member, said support means including means journalling said shafts in fixed relative spaced relation.

8. The combination of claim 7 wherein said means journalling said shafts in fixed relative relation include means releasably fixing the axes of rotation of said shafts in relative spaced relation.

9. The combination of claim 1 wherein said shafts are disposed in generally the same plane and are mounted for relative oscillatory movement about axes disposed substantially normal relative to said plane.

10. The combination of claim 1 wherein there is provided support means for journalling said drive shafts, means connected with said support means and adapted to suspend the latter for vertical movement, said suspension means including counterbalance means substantially balancing the weight of said support means, said shafts and said flexible member, said support means being supported for relative rotation about axes disposed generally normal to said plane and releasably fixed relative to each other.

11. In a device of the character described, elongated generally cylindrical resilient roll means disposed so as to follow a path defining an animal-embracing curvature and including journalled opposite end portions, means drivingly connected to and supporting said opposite end portions for rotation of said roll means about its longitudinal axis and comprising the sole support for said roll means, and anchor means carried by said roll means at points spaced longitudinally therealong adapted to be attached to selected portions of the hide of an animal carcass embraced by said roll means.

References Cited

UNITED STATES PATENTS 2,770,006  11/1956  Wilkens _____ 17—21

FOREIGN PATENTS 251,963  5/1964  Australia.

LUCIE H. LAUDENSLAGER, *Primary Examiner.*